(12) United States Patent
Miyazaki

(10) Patent No.: US 8,394,875 B2
(45) Date of Patent: Mar. 12, 2013

(54) RUBBER COMPOSITION FOR BASE TREAD, AND PNEUMATIC TIRE

(75) Inventor: Tatsuya Miyazaki, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 0 days.

(21) Appl. No.: 13/216,283

(22) Filed: Aug. 24, 2011

(65) Prior Publication Data

US 2012/0053263 A1 Mar. 1, 2012

(30) Foreign Application Priority Data

Aug. 25, 2010 (JP) ................................ 2010-188672

(51) Int. Cl.
*C08K 5/5398* (2006.01)

(52) U.S. Cl. .................. 524/137; 524/495; 524/496

(58) Field of Classification Search .................. 524/137, 524/495, 496
See application file for complete search history.

(56) References Cited

U.S. PATENT DOCUMENTS

| | | | |
|---|---|---|---|
| 5,770,632 A * | 6/1998 | Sekhar et al. ................. | 521/41.5 |
| 2012/0083559 A1* | 4/2012 | Costantini ..................... | 524/122 |

FOREIGN PATENT DOCUMENTS

| | | | |
|---|---|---|---|
| EP | 1767569 A * | 3/2007 | |
| JP | 2000-154203 A * | 6/2000 | |
| JP | 2000-313768 A | 11/2000 | |
| JP | 2002-80636 A | 3/2002 | |
| JP | 2002-521516 A | 7/2002 | |
| JP | 2004-238507 A | 8/2004 | |
| JP | 2004-256792 A | 9/2004 | |
| JP | 2006-28245 A | 2/2006 | |
| JP | 2009-19097 A | 1/2009 | |
| JP | 2009-46578 A | 3/2009 | |
| JP | 2009-84534 A | 4/2009 | |
| JP | 2009-114427 A | 5/2009 | |

* cited by examiner

*Primary Examiner* — Peter Szekely
(74) *Attorney, Agent, or Firm* — Birch, Stewart, Kolasch & Birch, LLP

(57) ABSTRACT

The present invention aims to provide a rubber composition for a base tread capable of enhancing fuel economy, elongation at break and durability in a balanced manner while maintaining favorable handling stability and processability (extrusion processability) even if the amount of zinc oxide is reduced, and a pneumatic tire having a base tread produced from the rubber composition. The present invention relates to a rubber composition for a base tread including: a rubber component; a compound represented by Formula (I):

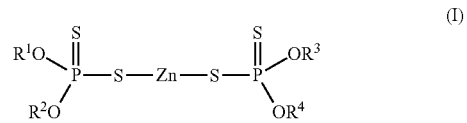

wherein $R^1$ to $R^4$ each independently represent a C1 to C18 linear or branched alkyl group or a C5 to C12 cycloalkyl group; and zinc oxide, wherein the amount of the compound represented by Formula (I) is 0.2 to 6 parts by mass and the amount of the zinc oxide is 1.0 part by mass or less, relative to 100 parts by mass of the rubber component.

11 Claims, No Drawings

RUBBER COMPOSITION FOR BASE TREAD, AND PNEUMATIC TIRE

TECHNICAL FIELD

The present invention relates to a rubber composition for a base tread, and a pneumatic tire using the same.

BACKGROUND ART

Rolling resistance of tires is mainly caused by energy losses due to repeated deformation of the rubbers during running. In order to reduce the rolling resistance, for example, a structure has been proposed in which a tread, which contributes the most to the rolling resistance, has two rubber layers, with the inner one (base tread) formed from a rubber composition causing a small energy loss and the outer one (cap tread) formed from a rubber composition having excellent abrasion resistance. Thus, rubber compositions used for the base tread are required to have superior fuel economy to rubber compositions used for the cap tread. Additionally, the rubber compositions for the base tread are required to have excellent handling stability, elongation at break, and durability.

In order to satisfy these requirements, for example, a rubber composition for a base tread is used which includes a rubber component composed of an isoprene-based rubber, butadiene rubber and a modified styrene butadiene rubber, and also includes zinc oxide typically in an amount of 2.5 to 5 parts by mass relative to 100 parts by mass of the rubber component.

Meanwhile, these days, zinc oxide included in tire rubber compositions has been regarded as a problem from the viewpoint of environmental pollution, and thus reduction of the zinc oxide content is desired. However, the reduction of the zinc oxide content tends to deteriorate fuel economy, handling stability, elongation at break, and durability. For this reason, the reduction of the zinc oxide content has been practically difficult.

Various attempts have been made to enhance the performances required for the base tread. For example, the fuel economy can be significantly enhanced by reducing the filler content and adding a modified polymer such as modified styrene butadiene rubber. However, this arrangement causes a significant decrease in elongation at break (especially, elongation at break at high temperatures), and therefore adding a large amount of zinc acid is necessary. Thus, further improvement is still needed to enhance fuel economy and elongation at break while reducing the amount of zinc oxide.

Patent Document 1 discloses the use of Tackirol V200 (product of Taoka Chemical Co., Ltd.) as a hybrid crosslinking coagent. This arrangement can enhance fuel economy; however, disadvantageously, the dispersibility of Tackirol V200 is low. Therefore, further improvement is required for enhancing fuel economy, elongation at break and durability in a balanced manner while maintaining favorable handling stability and processability (extrusion processability). Moreover, further improvement is required for reducing the amount of zinc oxide.

Patent Document 1: JP 2009-84534 A

SUMMARY OF THE INVENTION

The present invention aims to solve the foregoing problems and to provide a rubber composition for a base tread which can enhance fuel economy, elongation at break, and durability in a balanced manner while maintaining favorable handling stability and processability (extrusion processability) even if the amount of zinc oxide is reduced. The present invention also aims to provide a pneumatic tire having a base tread produced from the rubber composition.

The inventor of the present application has made intensive investigation and as a result has found that even if the zinc oxide content is reduced to a predetermined amount or less, addition of a specific amount of a specific compound can achieve more uniform crosslinking of polymers, which in turn enhances fuel economy, elongation at break, and durability in a balanced manner while maintaining favorable handling stability and processability (extrusion processability). Therefore, the present invention has been completed.

Specifically, the present invention relates to a rubber composition for a base tread, including:

a rubber component;

a compound represented by Formula (I):

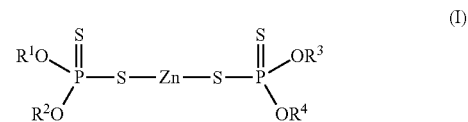

wherein $R^1$ to $R^4$ each independently represent a C1 to C18 linear or branched alkyl group or a C5 to C12 cycloalkyl group; and zinc oxide, wherein the amount of the compound represented by Formula (I) is 0.2 to 6 parts by mass and the amount of the zinc oxide is 1.0 part by mass or less, relative to 100 parts by mass of the rubber component.

Preferably, the amount of the compound represented by Formula (I) is 0.4 to 6 parts by mass relative to 100 parts by mass of the rubber component.

Preferably, the total amount of silica and carbon black is 20 to 50 parts by mass relative to 100 parts by mass of the rubber component.

Preferably, the rubber composition includes silica in an amount of 7 to 40 parts by mass relative to 100 parts by mass of the rubber component.

Preferably, the rubber component includes an isoprene-based rubber.

Preferably, the rubber component further includes at least one rubber selected from the group consisting of a modified butadiene rubber, a modified styrene butadiene rubber, and a 1,2-syndiotactic polybutadiene crystal-containing butadiene rubber.

The present invention also relates to a pneumatic tire having a base tread produced from the rubber composition.

According to the present invention, the rubber composition for a base tread contains a specific amount of the compound represented by Formula (I), and thus can enhance fuel economy, elongation at break, and durability in a balanced manner while maintaining favorable handling stability and processability (extrusion processability) even if the amount of zinc oxide is reduced (to a predetermined amount or less). Therefore, use of the rubber composition for a base tread of a tire can provide a pneumatic tire having enhanced fuel economy and durability in a balanced manner while maintaining favorable handling stability. Also, since the rubber composition contains only a predetermined amount or less of zinc acid, it can avoid polluting the environment.

BEST MODE FOR CARRYING OUT THE INVENTION

The rubber composition for a base tread according to the present invention includes a specific amount of the compound represented by Formula (I) and a predetermined amount or less of zinc oxide.

The compound represented by Formula (I) has a zinc atom at the center of the structure, and thus exhibits not only an excellent crosslinking promotion effect but also excellent dispersibility. Moreover, zinc in the form of the compound represented by Formula (I) does not form a mass like zinc oxide, but is finely dispersed in a molecular level. Therefore, addition of a specific amount of the compound represented by Formula (I) makes it possible to form a uniform crosslinking even if the amount of zinc oxide is reduced (to a predetermined amount or less). As a result, the elongation at break, fuel economy and durability can be enhanced while maintaining favorable handling stability and processability (extrusion processability).

Moreover, the addition of the specific amount of the compound represented by Formula (I) allows reduction of the zinc oxide content (to a predetermined amount or less), which leads to prevention of environmental pollution.

That is, the rubber composition of the present invention can enhance fuel economy, elongation at break and durability in a balanced manner while maintaining favorable handling stability and processability (extrusion processability) even if the amount of zinc oxide is reduced.

It should be noted that although zinc methacrylate has good dispersibility, it has an inferior crosslinking promotion effect to that of the compound represented by Formula (I), and does not sufficiently enhance the foregoing performances.

The mechanisms of the crosslinking promotion effect of the compound represented by Formula (I) are not clear, but the following mechanisms a) to b) are presumable.

a) The compound represented by Formula (I) is bonded to silica (a hydroxy group of silica) and mediates the bonding between a silane coupling agent and silica.

b) The compound represented by Formula (I) is highly dispersed in the rubber composition, is bonded to a vulcanization (crosslinking) accelerator, and mediates the bonding between the vulcanization accelerator and the rubber component.

It is known that DPG, which is a vulcanization accelerator preferably used in a rubber composition containing silica, has the effect a). In the case that DPG is replaced with the compound represented by Formula (I), the compound exhibits performance superior to DPG, which means that the mechanism a) may be involved. Meanwhile, when the compound represented by Formula (I) is added, a similar hardness can be secured even if the amount of vulcanization accelerator is decreased, and the performance can be improved even without a silane coupling agent, which means that the mechanism b) may also probably be involved. Since the compound represented by Formula (I) has a molecular chain of an appropriate length and has low polarity, the compound has a structure capable of easily dispersing in rubber polymers and easily coming close to a vulcanization accelerator. The aforementioned effects are presumably due to such a structure of the compound represented by Formula (I).

In the Formula (I), $R^1$ to $R^4$ each independently represent a C1 to C18 linear or branched alkyl group or a C5 to C12 cycloalkyl group. Examples of the linear or branched alkyl group for $R^1$ to $R^4$ include methyl group, ethyl group, n-propyl group, iso-propyl group, n-butyl group, 4-methylpentyl group, 2-ethylhexyl group, octyl group, and octadecyl group. Examples of the cycloalkyl group include cyclopentyl group, cyclohexyl group, and cyclooctyl group.

Among the examples, $R^1$ to $R^4$ each preferably represent a C2 to C8 linear or branched alkyl group, and more preferably n-butyl group, n-propyl group, iso-propyl group, or n-octyl group, from the viewpoints of high dispersibility in rubber and easy production.

Examples of the compound represented by Formula (I) include TP-50 and ZBOP-50 (produced by Rhein Chemie) and similar compounds thereto (for example, $R^1$ to $R^4$ are each n-propyl group, iso-propyl group, or n-octyl group).

The amount (amount of active ingredient) of the compound represented by Formula (I) is 0.2 parts by mass or more, preferably 0.4 parts by mass or more, and more preferably 0.8 parts by mass or more, relative to 100 parts by mass of the rubber component. If the amount is less than 0.2 parts by mass, the effects of the compound represented by Formula (I) tend not to be sufficiently obtained.

The amount is 6 parts by mass or less, preferably 5 parts by mass or less, and more preferably 4 parts by mass or less, relative to 100 parts by mass of the rubber component. If the amount exceeds 6 parts by mass, the scorch time tends to be shortened, so that the extrusion processability tends to deteriorate.

Due to the excellent crosslinking promotion effect of the compound represented by Formula (I), the amount of zinc oxide can be reduced in the rubber composition of the present invention. Therefore, in the rubber composition of the present invention, the amount of zinc oxide is 1.0 part by mass or less, preferably 0.5 parts by mass or less, more preferably 0.3 parts by mass or less, further preferably 0.1 parts by mass or less, and most preferably 0 parts by mass (zinc oxide free), relative to 100 parts by mass of the rubber component. Accordingly, the rubber composition can prevent environmental pollution. Further, the compound represented by Formula (I) is highly dispersed in rubber, and then is more likely to be bonded to a vulcanization accelerator, which results in sufficient handling stability, fuel economy, elongation at break and durability. This is supposedly because a sulfur atom or a zinc atom is released from the compound represented by Formula (I) to form a complex with the vulcanization accelerator; but in the case of adding zinc oxide, a zinc atom is less likely to be released from the compound represented by Formula (I).

Examples of rubbers that can be used in the present invention include diene rubbers such as isoprene-based rubbers, butadiene rubber (BR), styrene butadiene rubber (SBR), styrene isoprene butadiene rubber (SIBR), ethylene propylene diene rubber (EPDM), chloroprene rubber (CR) and acrylonitrile butadiene rubber (NBR). Each of these may be used singly or two or more of these may be used in combination. Among the examples, isoprene-based rubbers are preferable because of their excellent elongation at break and durability required for a base tread. Also, combined use of an isoprene-based rubber with BR and/or SBR is more preferable because the combination shows excellent handling stability, fuel economy, elongation at break and durability required for a base tread.

In the case where an isoprene-based rubber is added as the rubber component, the performance-improving effects of the compound represented by Formula (I) are enhanced compared with the case where SBR, for example, is used alone as the rubber component.

Examples of the isoprene-based rubber include synthetic isoprene rubber (IR), natural rubber (NR), and modified natural rubber. Examples of the NR include deproteinized natural rubber (DPNR) and highly purified natural rubber (HPNR). Examples of the modified natural rubber include epoxidized natural rubber (ENR), hydrogenated natural rubber (HNR), and grafted natural rubber. Specific examples of the NR include those generally used in the tire industry such as SIR20, RSS#3 and TSR20. NR and IR are preferable and NR is more preferable among the examples.

The isoprene-based rubber content in 100% by mass of the rubber component is preferably 30% by mass or more, and more preferably 50% by mass or more. If the content is less than 30% by mass, sufficient elongation at break and durability may not be obtained. The isoprene-based rubber content is preferably 80% by mass or less, and more preferably 75% by mass or less. If the content exceeds 80% by mass, sufficient crack growth resistance and fuel economy may not be obtained.

The SBR is not particularly limited. Examples of the SBR include emulsion-polymerized styrene butadiene rubber (E-SBR), solution-polymerized styrene butadiene rubber (S-SBR), and modified SBR which is modified with a modifying agent such as 3-aminopropyldimethylmethoxysilane. Modified SBR is preferable among the examples.

As the modified SBR, a solution-polymerized styrene butadiene rubber (SBR) modified with the compound represented by Formula (II) shown below (modified S-SBR (modified SBR described in JP-A 2010-111753)) is preferably used. This modified S-SBR is easy to control the molecular weight of the polymer and enables reduction of low-molecular weight components which increase the tan δ. Furthermore, the bonding between silica and the polymer chains is strengthened so that the fuel economy and durability can be enhanced.

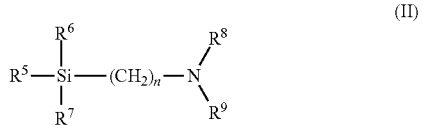

(II)

In the formula, $R^5$, $R^6$ and $R^7$ are the same or different, and each represent an alkyl group, an alkoxy group (preferably a C1 to C8, more preferably C1 to C6, and further preferably C1 to C4 alkoxy group), a silyloxy group, an acetal group, a carboxyl group (—COOH), a mercapto group (—SH) or a derivative thereof; $R^8$ and $R^9$ are the same or different, and each represent a hydrogen atom or an alkyl group (preferably a C1 to C4 alkyl group); and n represents an integer (preferably 1 to 5, more preferably 2 to 4, and further preferably 3).

$R^5$, $R^6$ and $R^7$ are each preferably an alkoxy group. In this case, excellent fuel economy and durability can be achieved.

Specific examples of the compound represented by Formula (II) include 3-aminopropyldimethylmethoxysilane, 3-aminopropylmethyldimethoxysilane, and 2-dimethylaminoethyltrimethoxysilane. Each of these may be used singly or two or more of these may be used in combination.

The SBR preferably has a bound styrene content of 23% by mass or less, more preferably 15% by mass or less, and further preferably 12% by mass or less. If the bound styrene content exceeds 23% by mass, the tensile strength may decrease. The lower limit of the bound styrene content of SBR is not particularly limited.

The styrene content is determined by $H^1$-NMR measurement.

The SBR content in 100% by mass of the rubber component is preferably 5% by mass or more, and more preferably 10% by mass or more. If the SBR content is less than 5% by mass, sufficient reversion resistance, fuel economy and handling stability may not be obtained. The SBR content is preferably 40% by mass or less, more preferably 30% by mass or less, and further preferably 25% by mass or less. If the SBR content exceeds 40% by mass, the elongation at break may decrease.

The BR is not particularly limited and may be one generally used in the tire industry. Examples thereof include: BRs with a high cis content such as BR1220 (produced by ZEON Corporation), and BR130B and BR150B (both produced by Ube Industries, Ltd.), and 1,2-syndiotactic polybutadiene crystal (SPB)-containing BRs such as VCR412 and VCR617 (both produced by Ube Industries, Ltd.). Moreover, modified BR such as tin-modified butadiene rubber (tin-modified BR) which is modified with a tin compound, and a butadiene rubber modified with the compound represented by Formula (II) may be used.

Among the examples, modified BR is preferable, and tin-modified BR is more preferable because they lead to less heat build-up (excellent fuel economy). Moreover, SPB-containing BR is also preferable because of its excellent extrusion processability and handling stability due to the SPB orientation (arrangement).

The tin-modified BR may be prepared by polymerization of 1,3-butadiene with a lithium initiator, followed by addition of a tin compound. The tin-modified BR preferably has a tin-carbon bond at a molecular end thereof. Use of the tin-modified BR contributes to decrease in Tg (glass transition temperature) of the polymers, and to formation of a strong bond between filler such as carbon black and the polymers.

Examples of the lithium initiator include lithium compounds such as alkyllithium, aryllithium, allyllithium, vinyllithium, organotin-lithium, and organonitrogen-lithium compounds. Use of a lithium compound as the initiator makes it possible to produce a tin-modified BR with a high vinyl content and a low cis content.

Examples of the tin compound include: tin tetrachloride, butyltin trichloride, dibutyltin dichloride, dioctyltin dichloride, tributyltin chloride, triphenyltin chloride, diphenyldibutyltin, triphenyltin ethoxide, diphenyldimethyltin, ditolyltin chloride, diphenyltin dioctanoate, divinyldiethyltin, tetrabenzyltin, dibutyltin distearate, tetraallyltin, and p-tributyltin styrene. Each of these may be used singly, or two or more of these may be used in combination.

The tin-atom content in the tin-modified BR is 50 ppm or more, and preferably 60 ppm or more. If the content is less than 50 ppm, the dispersibility of carbon black in the tin-modified BR may not be sufficiently enhanced and the tan δ may increase. The tin-atom content is 3000 ppm or less, preferably 2500 ppm or less, and more preferably 250 ppm or less. If the content exceeds 3000 ppm, the resulting kneaded mixture is less likely to come together and may not provide a uniform edge profile, so that the extrusion processability of the kneaded mixture may deteriorate.

The molecular weight distribution (Mw/Mn) of the tin-modified BR is 2 or less, and preferably 1.5 or less. It is undesirable that the Mw/Mn exceeds 2 because, in such case, the dispersibility of carbon black deteriorates and the tan δ increases.

In the present invention, the number average molecular weight (Mn) and the weight average molecular weight (Mw) are determined relative to polystyrene standards by gel permeation chromatography (GPC).

The vinyl bond content in the tin-modified BR is 5% by mass or more, and preferably 7% by mass or more. If the vinyl bond content is less than 5% by mass, the polymerization (production) of the tin-modified BR is difficult. The vinyl bond content is 50% by mass or less, and preferably 20% by mass or less. If the vinyl bond content exceeds 50% by mass, the dispersibility of carbon black tends to be poor and the tensile strength tends to weaken.

The BR content in 100% by mass of the rubber component is preferably 10% by mass or more, and more preferably 15% by mass or more. If the BR content is less than 10% by mass, the crack growth resistance may deteriorate. The BR content is preferably 40% by mass or less, and more preferably 30% by mass or less. If the BR content exceeds 40% by mass, the elongation at break may deteriorate.

In order to enhance fuel economy, elongation at break, and durability in a balanced manner while maintaining favorable handling stability and processability (extrusion processability), the rubber composition of the present invention preferably includes an isoprene-based rubber and at least one rubber selected from the group consisting of a modified BR, a modified SBR, and an SPB-containing BR. More preferably, the rubber composition includes an isoprene-based rubber, a modified BR and a modified SBR in combination.

The total amount of isoprene-based rubber, modified BR, modified SBR and SPB-containing BR is preferably 80% by mass or more, more preferably 90% by mass or more, and further preferably 100% by mass, based on 100% by mass of the rubber component. If the total amount is less than 80% by mass, the effects of the present invention may not be sufficiently obtained.

Preferably, silica is used in the present invention. Addition of silica leads to less heat build-up and higher rubber strength. Thus, the fuel economy, elongation at break, durability and extrusion processability (especially elongation at break) can be enhanced. Combined use of the compound represented by Formula (I) and silica can optimize the initial curing rate, and can synergistically improve fuel economy, elongation at break, and durability. In general, the use of the compound represented by Formula (I) increases the initial curing rate. The combined use of the compound represented by Formula (I) with silica can optimize the initial curing rate. This is presumably because the curing rate can be slowed down by the use of silica, whose surface is acidic.

The silica is not particularly limited, and examples thereof include dry silica (silicic anhydride) and wet silica (hydrous silicic acid). Wet silica is preferable because it has more silanol groups.

The nitrogen adsorption specific surface area ($N_2SA$) of silica is preferably 40 $m^2/g$ or more, more preferably 60 $m^2/g$ or more, and further preferably 100 $m^2/g$ or more. If the $N_2SA$ of silica is less than 40 $m^2/g$, the elongation at break and durability tend to decrease. The $N_2SA$ of silica is preferably 220 $m^2/g$ or less, more preferably 150 $m^2/g$ or less, and further preferably 120 $m^2/g$ or less. If the $N_2SA$ exceeds 220 $m^2/g$, the fuel economy and extrusion processability tend to deteriorate.

The $N_2SA$ of silica is a value measured by the BET method according to ASTM D3037-81.

The amount of silica is preferably 7 parts by mass or more, more preferably 10 parts by mass or more, and further preferably 12 parts by mass or more, relative to 100 parts by mass of the rubber component. If the amount of silica is less than 7 parts by mass, the effects of silica addition tend not to be sufficiently exerted. The amount of silica is preferably 40 parts by mass or less, and more preferably 37 parts by mass or less, relative to 100 parts by mass of the rubber component. If the amount of silica exceeds 40 parts by mass, the handling stability tends to deteriorate.

Preferably, the silica is used concomitantly with a silane coupling agent. Any silane coupling agents conventionally used with silica in the rubber industry can be used. Examples of the silane coupling agent include: sulfide-type silane coupling agents such as bis(3-triethoxysilylpropyl)disulfide and bis(3-triethoxysilylpropyl)tetrasulfide; mercapto-type silane coupling agents (mercapto group-containing silane coupling agents) such as 3-mercaptopropyltrimethoxysilane, and NXT-Z100 and NXT-Z45 (both produced by Momentive Performance Materials); vinyl-type silane coupling agents such as vinyltriethoxysilane; amino-type silane coupling agents such as 3-aminopropyltriethoxysilane; glycidoxy-type silane coupling agents such as γ-glycidoxypropyltriethoxysilane; nitro-type silane coupling agents such as 3-nitropropyltrimethoxysilane; and chloro-type silane coupling agents such as 3-chloropropyltrimethoxysilane. Each of these silane coupling agents may be used singly or two or more of these may be used in combination. Among the examples, sulfide-type silane coupling agents and mercapto-type silane coupling agents are preferable. If a mercapto-type silane coupling agent is used, the handling stability, fuel economy, elongation at break, and durability can be favorably improved.

The amount of silane coupling agent is preferably 2 parts by mass or more, and more preferably 5 parts by mass or more, relative to 100 parts by mass of silica. If the amount is less than 2 parts by mass, the elongation at break and the performance in terms of rolling resistance tend to largely deteriorate. The amount of silane coupling agent is preferably 15 parts by mass or less, and more preferably 10 parts by mass or less, relative to 100 parts by mass of silica. If the amount exceeds 15 parts by mass, the effects of the silane coupling agent, such as improvement in elongation at break and reduction in rolling resistance (improvement in fuel economy) tend not to be exerted.

The rubber composition preferably includes carbon black. Addition of carbon black provides better reinforcement, which results in further improvement in handling stability, elongation at break, and durability. Examples of the carbon black include those generally used in the tire industry such as GPF, HAF, ISAF, and SAF.

The nitrogen adsorption specific surface area ($N_2SA$) of carbon black is preferably 10 $m^2/g$ or more, and more preferably 20 $m^2/g$ or more. If the $N_2SA$ is less than 10 $m^2/g$, sufficient reinforcement may not be achieved, and thus the handling stability, elongation at break and durability may not be sufficiently enhanced. The $N_2SA$ of carbon black is preferably 90 $m^2/g$ or less, more preferably 80 $m^2/g$ or less, and further preferably 50 $m^2/g$ or less. If the $N_2SA$ is 50 $m^2/g$ or less, the fuel economy can be especially enhanced. If the $N_2SA$ exceeds 90 $m^2/g$, the extrusion processability and fuel economy tend to deteriorate.

The $N_2SA$ of carbon black is determined by the method A of page 7 in JIS K 6217.

The amount of carbon black is preferably 1 part by mass or more, and more preferably 3 parts by mass or more, relative to 100 parts by mass of the rubber component. If the amount is less than 1 part by mass, the resistance to ultraviolet degradation and the resistance to oxidative degradation may not be secured during use or processing. The amount of carbon black is preferably 40 parts by mass or less, more preferably 37 parts by mass or less, and further preferably 10 parts by mass or less, relative to 100 parts by mass of the rubber component. If the amount exceeds 40 parts by mass, the fuel economy tends to deteriorate.

The total amount of silica and carbon black is preferably 20 parts by mass or more, and more preferably 25 parts by mass or more, relative to 100 parts by mass of the rubber component. If the total amount is less than 20 parts by mass, sufficient handling stability, processability (extrusion processability), fuel economy, elongation at break, and durability may not be obtained. The total amount is preferably 50 parts by mass or less, and more preferably 45 parts by mass or less, relative to 100 parts by mass of the rubber component. If the total amount exceeds 50 parts by mass, the fuel economy tends to deteriorate.

In the present invention, when the total amount of silica and carbon black is within the above range, the performance—improving effects of the compound represented by Formula (I) added in a specific amount are greatly enhanced.

In addition to the above-mentioned ingredients, the rubber composition of the present invention may optionally contain compounding ingredients commonly used in production of rubber compositions. Examples of the compounding ingredients include: reinforcing fillers such as clay; stearic acid; various antioxidants; oils such as aromatic oils; waxes; vulcanizing agents such as sulfur; vulcanization accelerators; and vulcanization accelerator aids.

Examples of the vulcanization accelerator include sulfenamide vulcanization accelerators such as N-tert-butyl-2-benzothiazolylsulfenamide (TBBS), N-cyclohexyl-2-benzothiazolylsulfenamide (CBS) and N,N-dicyclohexyl-2-benzothiazolylsulfenamide (DZ), and mercaptobenzothiazole (MBT), dibenzothiazolyldisulfide (MBTS), and diphenylguanidine (DPG). Particularly, sulfenamide vulcanization accelerators are preferable and TBBS is more preferable because they are excellent in curing properties, and lead to less heat build-up of the vulcanized rubber composition and less scorch.

Since the compound represented by Formula (I) is highly active, addition of the compound tends to cause rubber scorch (discoloration) easily in the kneading step and increase the crosslink density. Therefore, the amount of vulcanization accelerator is preferably reduced in the rubber composition of the present invention. Specifically, the amount of vulcanization accelerator is preferably 2.0 parts by mass or less, more preferably 1.6 parts by mass or less, and further preferably 1.4 parts by mass or less, relative to 100 parts by mass of the rubber component. If the amount exceeds 2.0 parts by mass, the crosslink density may excessively increase, likely resulting in a decrease in elongation at break. The amount of vulcanization accelerator is preferably 0.5 parts by mass or more, and more preferably 0.6 parts by mass or more, relative to 100 parts by mass of the rubber component. If the amount is less than 0.5 parts by mass, the crosslink density may be low, likely resulting in a decrease in complex modulus (E*). Therefore, sufficient handling stability may not be obtained.

Preferable examples of the vulcanization accelerator aid (vulcanization retarder) include N-cyclohexylthiophthalimide (Retarder CTP produced by Ouchi Shinko Chemical Industrial Co., Ltd., and Retarder PVI produced by Monsanto Company) which can slow down the curing rate and prevent scorching. It is preferable to add 0.3 parts by mass or less of N-cyclohexylthiophthalimide relative to 100 parts by mass of the rubber component. An amount of N-cyclohexylthiophthalimide exceeding 0.3 parts by mass may cause blooming in processing, likely resulting in lower adhesiveness and decreased adhesion to other rubber compositions.

The rubber composition of the present invention can be used for a base tread. The base tread refers to an inner layer portion of a tread having a multilayer structure. For example, the base tread is an inner surface layer of a tread having a two-layer structure (outer surface layer (cap tread) and inner surface layer (base tread)). Specifically, the base tread is a tire component as shown in FIG. 1 of JP-A 2008-285628, FIG. 1 of JP-A 2008-303360, and the like.

The rubber composition of the present invention may be produced by a known method. For example, the rubber composition may be produced by mixing and kneading the above-mentioned ingredients with a rubber kneader such as a Banbury mixer or an open roll mill.

The pneumatic tire of the present invention can be produced using the rubber composition of the present invention by a usual method. More specifically, a tire component such as a base tread is produced from the rubber composition, and the tire component is assembled with other tire components, and then heated and pressurized on a tire building machine, whereby a pneumatic tire is produced.

The pneumatic tire of the present invention can be used for passenger vehicles, trucks/buses, light trucks, and the like. The pneumatic tire of the present invention is excellent in handling stability, fuel economy, and durability. The pneumatic tire of the present invention may be a run-flat tire. In the case of applying the rubber composition of the present invention to a run-flat tire, the obtained run-flat tire is excellent in handling stability, fuel economy, and durability (in particular, run-flat durability).

EXAMPLES

The present invention will be more specifically described based on examples, but the present invention is not limited to these examples.

The respective chemical agents used in Examples and Comparative Examples are listed below.

Modified SBR: HPR340 produced by JSR Corporation (modified S-SBR, bound styrene content: 10% by mass, modified with compound represented by Formula (II))

Modified BR: BR1250H produced by ZEON Corporation (tin-modified BR, prepared by polymerization with lithium as initiator, vinyl bond content: 10 to 13% by mass, Mw/Mn: 1.5, tin-atom content: 250 ppm)

BR: VCR617 produced by Ube Industries, Ltd. (high-cis BR, 1,2-syndiotactic polybutadiene crystal (SPB) dispersion, 1,2-syndiotactic polybutadiene crystal content (amount of boiling n-hexane insoluble matter): 17% by mass, melting point of 1,2-syndiotactic polybutadiene crystals: 200° C.)

NR: TSR20

Silica (1): Z115Gr produced by Rhodia Japan ($N_2SA$: 112 $m^2/g$)

Silica (2): RP80Gr produced by Rhodia Japan ($N_2SA$: 85 $m^2/g$)

Carbon black (1): N660 produced by Mitsubishi Chemical Corporation ($N_2SA$: 35 $m^2/g$)

Carbon black (2): N351H produced by Mitsubishi Chemical Corporation ($N_2SA$: 71 $m^2/g$)

Oil: Vivatec 500 produced by H&R (TDAE oil)

Silane coupling agent (1): Si266 produced by Evonik Degussa (bis(3-triethoxysilylpropyl)disulfide)

Silane coupling agent (2): NXT-Z100 produced by Momentive Performance Materials (polymer represented by following formula)

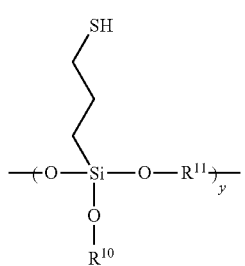

Wax: Sunnoc N produced by Ouchi Shinko Chemical Industrial Co., Ltd.

Antioxidant: Antigene 6C (6PPD) produced by Sumitomo Chemical Co., Ltd.

Stearic acid: Stearic acid produced by NOF Corporation

Zinc oxide: Zinc oxide produced by Mitsui Mining & Smelting Co., Ltd.

Zinc methacrylate: SR709 produced by Sartomer

Sulfur: SEIMI sulfur produced by NIPPON KANRYU INDUSTRY CO., LTD. (insoluble sulfur with carbon disulfide-insoluble content of 60% or more, oil content: 10%)

Vulcanization accelerator TBBS: Nocceler NS produced by Ouchi Shinko Chemical Industrial Co., Ltd. (N-tert-butyl-2-benzothiazolylsulfenamide)

Crosslinking coagent V200: Tackirol V200 produced by Taoka Chemical Co., Ltd.

Crosslinking coagent SDT-50: SDT-50 produced by Rhein Chemie (compound represented by following formula, $R^{12}$ to $R^{15}$: 2-ethylhexyl group, x: 1 or more, amount of active ingredient: 50% by mass)

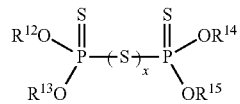

Crosslinking coagent TP-50: TP-50 produced by Rhein Chemie (compound represented by Formula (I), $R^1$ to $R^4$: n-butyl group, amount of active ingredient: 50% by mass)

Crosslinking coagent ZBOP-50: ZBOP-50 produced by Rhein Chemie (compound represented by Formula (I), $R^1$ to $R^4$: alkyl group, amount of active ingredient: 50% by mass)

Crosslinking coagent (Vulcanization retarder) PVI: Retarder PVI produced by Monsanto Company (N-cyclohexylthiophthalimide)

Examples 1 to 14 and Comparative Examples 1 to 11

According to the respective formulations shown in Tables 1 and 2, the chemical agents other than the sulfur, vulcanization accelerator, and crosslinking coagents were mixed and kneaded by a 1.7-L Banbury mixer until the temperature reached 180° C., whereby a kneaded mixture was prepared. Subsequently, to the resulting kneaded mixture were added the sulfur, vulcanization accelerator, and crosslinking coagent(s) and then they were kneaded with an open two-roll mill until the temperature reached 105° C., whereby an unvulcanized rubber composition was produced.

The resulting unvulcanized rubber composition was press-vulcanized at 170° C. for 12 minutes to provide a vulcanized rubber composition.

Also, the resulting unvulcanized rubber composition was processed into a base tread shape, and assembled with other tire components, followed by vulcanization at 170° C. for 12 minutes to provide a test tire (tire size: 225/40R18 88Y).

The following evaluations were made on the produced unvulcanized rubber compositions, vulcanized rubber compositions, and test tires. Tables 1 and 2 show the results.

(Handling stability (E*), Fuel economy (tan δ))

The loss tangent (tan δ) and the complex modulus (E*) of each of the vulcanized rubber compositions were measured with a viscoelasticity spectrometer (produced by Iwamoto Seisakusho Co., Ltd.) under the following conditions: a temperature of 40° C.; an initial strain of 10%; a dynamic strain of 2%; and a frequency of 10 Hz.

A smaller tan δ value means lower rolling resistance and thus better fuel economy. A larger E* value means better handling stability.

(Tensile Test)

A No. 3 dumbbell specimen prepared from each vulcanized rubber composition was subjected to a tensile test at room temperature in accordance with JIS K 6251 "Rubber, vulcanized or thermoplastic—Determination of tensile stress-strain properties" and the elongation at break (EB) (%) was measured. A larger EB value means higher elongation at break (tensile strength).

(Durability)

Each test tire was run on a test drum under the conditions of an air pressure of 240 kPa (corresponding to the air pressure against the maximum load), a speed of 100 km/h, a test environmental temperature of 30° C., and a 150% load of the maximum load (maximum internal pressure conditions) specified in JIS. Then, the running distance until the tire had a swollen appearance (until the tire was damaged) due to separation of the tread was measured. The determined value of running distance is expressed as an index relative to the value of Comparative Example 1 regarded as 100. The larger the index is, the better the durability is.

(Extrusion Processability)

Each unvulcanized rubber composition was passed through a cold feed extruder, and the rubber scorch resistance, the undersurface irregularities and the dimensional stability of the extrudate were evaluated.

AA: excellent, A: good, B: reduced productivity and uniformity, C: substantially reduced productivity, D: very poor (disadvantageous in production)

TABLE 1

| | | Comparative Examples | | | | | | | | | | |
|---|---|---|---|---|---|---|---|---|---|---|---|---|
| | | 1 | 2 | 3 | 4 | 5 | 6 | 7 | 8 | 9 | 10 | 11 |
| Formulation (part(s) by mass) | Modified SBR | 20 | 20 | 20 | — | 20 | 20 | 20 | 20 | 20 | 20 | 30 |
| | Modified BR | 20 | 20 | 20 | 20 | 20 | 20 | 20 | 20 | 20 | 20 | 30 |
| | BR | — | — | — | 20 | — | — | — | — | — | — | — |
| | NR | 60 | 60 | 60 | 60 | 60 | 60 | 60 | 60 | 60 | 60 | 40 |
| | Silica (1) | 35 | 35 | 35 | 30 | 35 | 35 | 25 | 35 | 35 | 35 | 35 |
| | Silica (2) | — | — | — | — | — | — | — | — | — | — | — |

TABLE 1-continued

|  |  | Comparative Examples | | | | | | | | | | |
|---|---|---|---|---|---|---|---|---|---|---|---|
|  |  | 1 | 2 | 3 | 4 | 5 | 6 | 7 | 8 | 9 | 10 | 11 |
|  | Carbon black (1) | 5 | 5 | 5 | 5 | 5 | 5 | 15 | 5 | 5 | 5 | 5 |
|  | Carbon black (2) | — | — | — | — | — | — | — | — | — | — | — |
|  | Oil | 2 | 2 | 2 | 2 | 2 | 2 | 2 | 2 | 2 | 2 | 2 |
|  | Silane coupling agent (1) | 2.8 | 2.8 | 2.8 | 2.4 | 2.8 | 2.8 | 2 | 2.8 | 2.8 | 2.8 | 2.8 |
|  | Silane coupling agent (2) | — | — | — | — | — | — | — | — | — | — | — |
|  | Wax | 1 | 1 | 1 | 1 | 1 | 1 | 1 | 1 | 1 | 1 | 1 |
|  | Antioxidant | 2 | 2 | 2 | 2 | 2 | 2 | 2 | 2 | 2 | 2 | 2 |
|  | Stearic acid | 2 | 2 | 2 | 2 | 2 | 2 | 2 | 2 | 2 | 2 | 2 |
|  | Zinc oxide | 10 | 2 | 10 | 10 | 2 | 16 | 10 | 10 | 10 | 10 | 16 |
|  | Zinc methacrylate | — | — | — | — | 4 | — | — | — | — | — | — |
|  | Sulfur | 2.67 | 2.67 | 1.8 | 2.67 | 2.3 | 2.67 | 2.67 | 2.33 | 2.67 | 2.67 | 2.67 |
|  | Vulcanization accelerator TBBS | 1.8 | 1.8 | 3.5 | 1.8 | 1.8 | 1.8 | 1.8 | 1.8 | 1.2 | 1.6 | 1.8 |
|  | Crosslinking coagent V200 | — | — | — | — | — | — | — | 4 | — | — | — |
|  | Crosslinking coagent SDT-50 | — | — | — | — | — | — | — | — | 2 | — | — |
|  | Crosslinking coagent TP-50 | — | — | — | — | — | — | — | — | — | 0.2 | — |
|  | Crosslinking coagent ZBOP-50 | — | — | — | — | — | — | — | — | — | — | — |
|  | Crosslinking coagent PVI | — | — | — | — | — | — | — | — | — | — | — |
| Performance evaluation | Handling stability (E*) | 3.05 | 2.85 | 2.99 | 3.07 | 3.09 | 3.2 | 3.22 | 3.15 | 3.14 | 3.09 | 3.33 |
|  | Fuel economy (tan δ) | 0.055 | 0.071 | 0.048 | 0.061 | 0.053 | 0.051 | 0.065 | 0.045 | 0.051 | 0.051 | 0.042 |
|  | Elongation at break (EB) | 530 | 470 | 475 | 515 | 555 | 550 | 510 | 490 | 545 | 535 | 510 |
|  | Durability | 100 | 75 | 90 | 90 | 105 | 110 | 95 | 85 | 110 | 102 | 110 |
|  | Extrusion processability | A | C | A | AA | AA | AA | A | A | A | A | B |

TABLE 2

|  |  | Examples | | | | | | | |
|---|---|---|---|---|---|---|---|---|---|
|  |  | 1 | 2 | 3 | 4 | 5 | 6 | 7 | 8 |
| Formulation (part(s) by mass) | Modified SBR | 20 | 20 | 20 | 20 | 20 | 20 | 20 | 20 |
|  | Modified BR | 20 | 20 | 20 | 20 | 20 | 20 | 20 | 20 |
|  | BR | — | — | — | — | — | — | — | — |
|  | NR | 60 | 60 | 60 | 60 | 60 | 60 | 60 | 60 |
|  | Silica (1) | 35 | 35 | 35 | 25 | 35 | 35 | 35 | — |
|  | Silica (2) | — | — | — | — | — | — | — | 35 |
|  | Carbon black (1) | 5 | 5 | 5 | 5 | 5 | 5 | 5 | 5 |
|  | Carbon black (2) | — | — | — | — | — | — | — | — |
|  | Oil | 2 | 2 | 2 | 2 | 2 | 2 | 2 | 2 |
|  | Silane coupling agent (1) | 2.8 | 2.8 | 2.8 | 2 | 2.8 | 2.8 | 2.8 | 2.8 |
|  | Silane coupling agent (2) | — | — | — | — | — | — | — | — |
|  | Wax | 1 | 1 | 1 | 1 | 1 | 1 | 1 | 1 |
|  | Antioxidant | 2 | 2 | 2 | 2 | 2 | 2 | 2 | 2 |
|  | Stearic acid | 2 | 2 | 2 | 2 | 2 | 2 | 2 | 2 |
|  | Zinc oxide | — | 0.5 | — | — | — | — | — | — |
|  | Zinc methacrylate | — | — | — | — | — | — | — | — |
|  | Sulfur | 2.67 | 2.67 | 2.22 | 2.67 | 2.67 | 2.22 | 2.67 | 2.22 |
|  | Vulcanization accelerator TBBS | 0.8 | 0.8 | 0.8 | 0.8 | 0.8 | 0.8 | 1.2 | 0.8 |
|  | Crosslinking coagent V200 | — | — | — | — | — | — | — | — |
|  | Crosslinking coagent SDT-50 | — | — | — | — | — | — | — | — |
|  | Crosslinking coagent TP-50 | 2 | 2 | 4 | 4 | — | 8 | 1 | 8 |
|  | Crosslinking coagent ZBOP-50 | — | — | — | — | 2 | — | — | — |
|  | Crosslinking coagent PVI | — | — | — | — | — | 0.1 | — | 0.1 |
| Performance evaluation | Handling stability (E*) | 3.05 | 3.01 | 3.21 | 3.08 | 3.04 | 3.07 | 3.04 | 3.13 |
|  | Fuel economy (tan δ) | 0.038 | 0.041 | 0.038 | 0.031 | 0.039 | 0.029 | 0.042 | 0.025 |
|  | Elongation at break (EB) | 575 | 560 | 605 | 540 | 580 | 580 | 550 | 520 |
|  | Durability | 125 | 120 | 140 | 125 | 125 | 140 | 115 | 125 |
|  | Extrusion processability | A | A | A | A | A | B | A | A |

|  |  | Examples | | | | | |
|---|---|---|---|---|---|---|---|
|  |  | 9 | 10 | 11 | 12 | 13 | 14 |
| Formulation (part(s) by mass) | Modified SBR | — | 30 | 40 | 20 | 20 | 20 |
|  | Modified BR | 20 | 30 | 40 | 20 | 20 | 20 |
|  | BR | 20 | — | — | — | — | — |
|  | NR | 60 | 40 | 20 | 60 | 60 | 60 |
|  | Silica (1) | 30 | 35 | 35 | 35 | 10 | — |
|  | Silica (2) | — | — | — | — | — | — |
|  | Carbon black (1) | 5 | 5 | 5 | 5 | 30 | 30 |
|  | Carbon black (2) | — | — | — | — | — | 10 |
|  | Oil | 2 | 2 | 2 | 2 | 2 | 2 |

TABLE 2-continued

| | | | | | | | |
|---|---|---|---|---|---|---|---|
| | Silane coupling agent (1) | 2.4 | 2.8 | 2.8 | — | 0.08 | — |
| | Silane coupling agent (2) | — | — | — | 2.8 | — | — |
| | Wax | 1 | 1 | 1 | 1 | 1 | 1 |
| | Antioxidant | 2 | 2 | 2 | 2 | 2 | 2 |
| | Stearic acid | 2 | 2 | 2 | 2 | 2 | 2 |
| | Zinc oxide | — | — | — | — | — | — |
| | Zinc methacrylate | — | — | — | — | — | — |
| | Sulfur | 2.22 | 2.22 | 2.22 | 2.67 | 2.67 | 2.67 |
| | Vulcanization accelerator TBBS | 0.8 | 0.8 | 0.8 | 0.8 | 0.8 | 0.8 |
| | Crosslinking coagent V200 | — | — | — | — | — | — |
| | Crosslinking coagent SDT-50 | — | — | — | — | — | — |
| | Crosslinking coagent TP-50 | 4 | 8 | 8 | 2 | 2 | 2 |
| | Crosslinking coagent ZBOP-50 | — | — | — | — | — | — |
| | Crosslinking coagent PVI | — | 0.1 | 0.1 | — | 0.2 | 0.2 |
| Performance evaluation | Handling stability (E*) | 3.21 | 3.22 | 3.39 | 3.12 | 3.34 | 3.65 |
| | Fuel economy (tan δ) | 0.044 | 0.02 | 0.019 | 0.031 | 0.044 | 0.05 |
| | Elongation at break (EB) | 565 | 530 | 450 | 590 | 535 | 515 |
| | Durability | 125 | 120 | 100 | 135 | 110 | 102 |
| | Extrusion processability | AA | A | B | A | A | B |

Tables 1 and 2 show that Examples using a specific amount of the compound represented by Formula (I) enhanced fuel economy, elongation at break, and durability in a balanced manner while maintaining favorable handling stability and processability (extrusion processability) even when the amount of zinc oxide was reduced (to a predetermined amount or less). In contrast, Comparative Examples not using the specific amount of the compound showed inferior performances to those of the Examples.

The invention claimed is:

1. A pneumatic tire having a base tread produced from a rubber composition for a base tread, comprising:
   a rubber component;
   a compound represented by Formula (I):

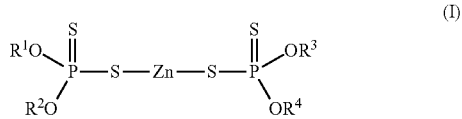

wherein $R^1$ to $R^4$ each independently represent a C1 to C18 linear or branched alkyl group or a C5 to C12 cycloalkyl group;
   zinc oxide; and
   carbon black having the nitrogen adsorption specific surface area of 10 to 50 m²/g,
   wherein the amount of the compound represented by Formula (I) is 0.2 to 6 parts by mass and the amount of the zinc oxide is 1.0 part by mass or less, relative to 100 parts by mass of the rubber component.

2. The pneumatic tire according to claim 1, wherein the amount of the compound represented by Formula (I) is 0.4 to 6 parts by mass relative to 100 parts by mass of the rubber component.

3. The pneumatic tire according to claim 1, wherein the rubber composition further comprises silica, and
   wherein the total amount of silica and carbon black is 20 to 50 parts by mass relative to 100 parts by mass of the rubber component.

4. The pneumatic tire according to claim 1, wherein the rubber composition further comprises silica in an amount of 7 to 40 parts by mass relative to 100 parts by mass of the rubber component.

5. The pneumatic tire according to claim 1, wherein the rubber component includes an isoprene-based rubber.

6. The pneumatic tire according to claim 5, wherein the rubber component further includes at least one rubber selected from the group consisting of a modified butadiene rubber, a modified styrene butadiene rubber, and a 1,2-syndiotactic polybutadiene crystal-containing butadiene rubber.

7. The pneumatic tire according to claim 5, wherein the rubber component further includes a butadiene rubber and/or styrene butadiene rubber.

8. The pneumatic tire according to claim 7, wherein the rubber component includes 30 to 80% by mass of the isoprene-based rubber, 5 to 40% by mass of the styrene butadiene rubber, and 10 to 40% by mass of the butadiene rubber.

9. The pneumatic tire according to claim 1, wherein the rubber component includes a tin-modified butadiene rubber.

10. The pneumatic tire according to claim 1, wherein the rubber component includes a styrene butadiene rubber modified by a compound represented by the formula (II):

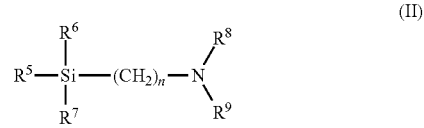

wherein $R^5$, $R^6$ and $R^7$ are the same or different, and each represent an alkyl group, an alkoxy group, a silyloxy group, an acetal group, a carboxyl group, a mercapto group or a derivative thereof; $R^8$ and $R^9$ are the same or different, and each represent a hydrogen atom or an alkyl group; and n represents an integer.

11. The pneumatic tire according to claim 1, wherein the rubber composition comprises carbon black in an amount of 1 to 40 parts by mass relative to 100 parts by mass of rubber component.

* * * * *